United States Patent
Hirano et al.

(10) Patent No.: US 9,053,731 B2
(45) Date of Patent: Jun. 9, 2015

(54) EXTENDED CAVITY VCSEL MOUNTED TO SUBSTRATE WITH ELECTRICAL AND THERMAL CONTACT TO SUBSTRATE AND OPTICAL POWER DIRECTED TOWARD SUBSTRATE

(75) Inventors: Toshiki Hirano, San Jose, CA (US); Fu-Ying Huang, San Jose, CA (US); Jia-Yang Juang, Santa Clara, CA (US); Barry Cushing Stipe, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/033,489

(22) Filed: Feb. 23, 2011

(65) Prior Publication Data

US 2012/0008233 A1  Jan. 12, 2012

Related U.S. Application Data

(60) Provisional application No. 61/363,128, filed on Jul. 9, 2010.

(51) Int. Cl.
*G11B 11/00* (2006.01)
*G11B 5/60* (2006.01)
*G11B 5/31* (2006.01)
*G11B 5/00* (2006.01)

(52) U.S. Cl.
CPC ............ *G11B 5/6088* (2013.01); *G11B 5/3106* (2013.01); *G11B 5/3133* (2013.01); *G11B 5/314* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 6,778,582 B1 | 8/2004 | Mooradian | |
| 6,999,384 B2 | 2/2006 | Stancil et al. | |
| 7,660,068 B1* | 2/2010 | Baumgart et al. | 360/75 |
| 7,880,996 B2 | 2/2011 | Stipe | |
| 8,077,418 B1* | 12/2011 | Hu et al. | 360/59 |
| 2003/0161245 A1* | 8/2003 | Henrichs | 369/95 |
| 2005/0189645 A1* | 9/2005 | Nakano et al. | 257/701 |
| 2006/0187564 A1* | 8/2006 | Sato et al. | 360/59 |
| 2008/0002298 A1* | 1/2008 | Sluzewski | 360/234.4 |
| 2008/0149809 A1 | 6/2008 | Hamann et al. | |
| 2008/0316872 A1* | 12/2008 | Shimizu et al. | 369/13.24 |
| 2009/0195919 A1* | 8/2009 | Mahadev | 360/86 |
| 2009/0225636 A1* | 9/2009 | Hirano et al. | 369/13.24 |
| 2009/0251825 A1* | 10/2009 | Honzawa et al. | 360/245.3 |
| 2010/0165499 A1 | 7/2010 | Stipe | |
| 2010/0165822 A1 | 7/2010 | Balamane et al. | |
| 2010/0202081 A1 | 8/2010 | Shimazawa et al. | |
| 2011/0103201 A1* | 5/2011 | Peng et al. | 369/13.24 |
| 2011/0164334 A1* | 7/2011 | Jin et al. | 360/59 |

(Continued)

OTHER PUBLICATIONS

Roelkens et al., "High Efficiency Diffractive Grating Couplers for Interfacing a Single Mode Optical Fiber With a Nanophotonic Silicon-On-Insulator Waveguide Circuit," Applied Physics Letters, vol. 92, 2008 American Institute of Physics, pp. 131101/1-131101/3.

*Primary Examiner* — Adam R Giesy
*Assistant Examiner* — Henok Heyi
(74) *Attorney, Agent, or Firm* — Zilka-Kotab, PC

(57) ABSTRACT

A system according to one embodiment includes a slider adapted for use in a hard disk drive; and a laser coupled to a slider, wherein electrical contacts of the laser are positioned towards or face the slider, wherein light from the laser is emitted towards the slider, wherein the slider acts as a heat sink for the laser.

21 Claims, 16 Drawing Sheets

(56) References Cited

U.S. PATENT DOCUMENTS

| | | | |
|---|---|---|---|
| 2011/0228416 A1* | 9/2011 | Sasaki et al. | 360/59 |
| 2011/0235495 A1* | 9/2011 | Todori et al. | 369/112.16 |
| 2011/0317527 A1* | 12/2011 | Wang et al. | 369/13.02 |
| 2012/0127839 A1* | 5/2012 | Rawat et al. | 369/13.33 |

* cited by examiner

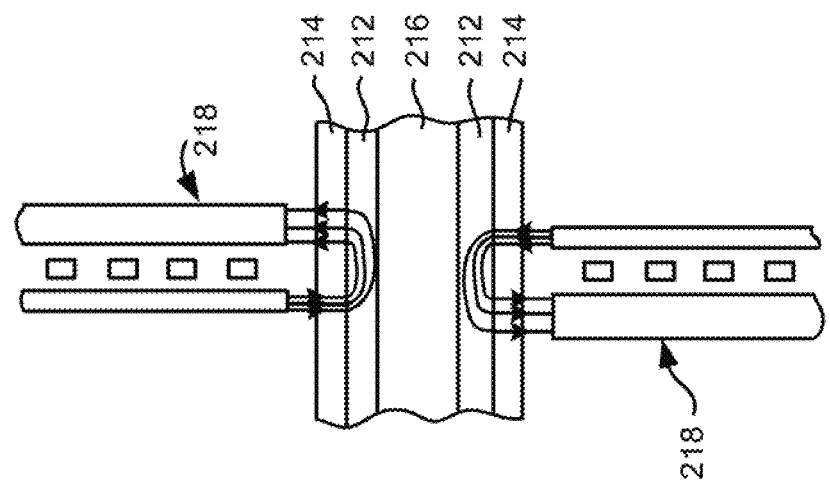
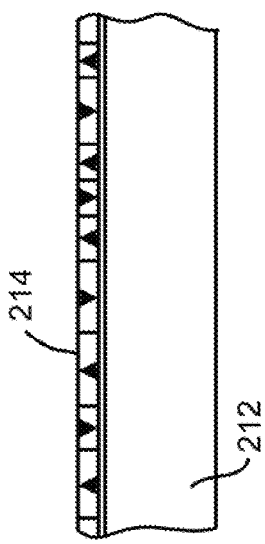
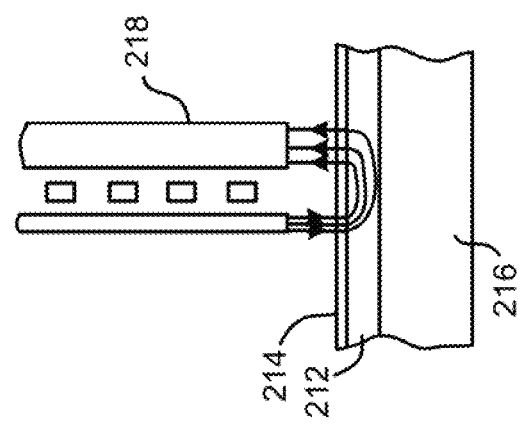
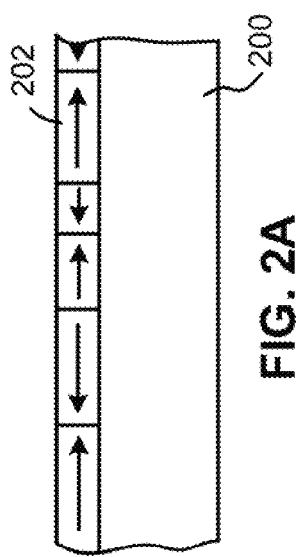
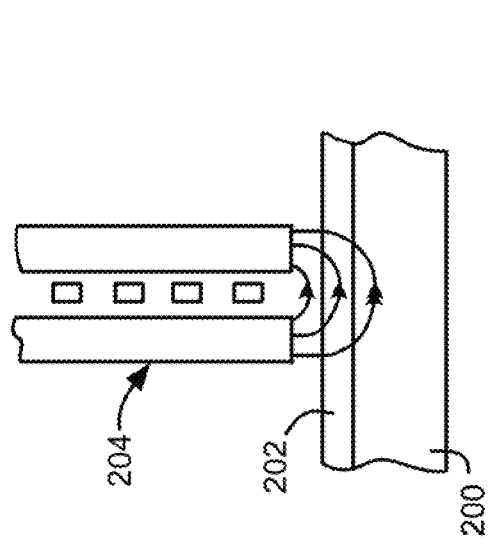

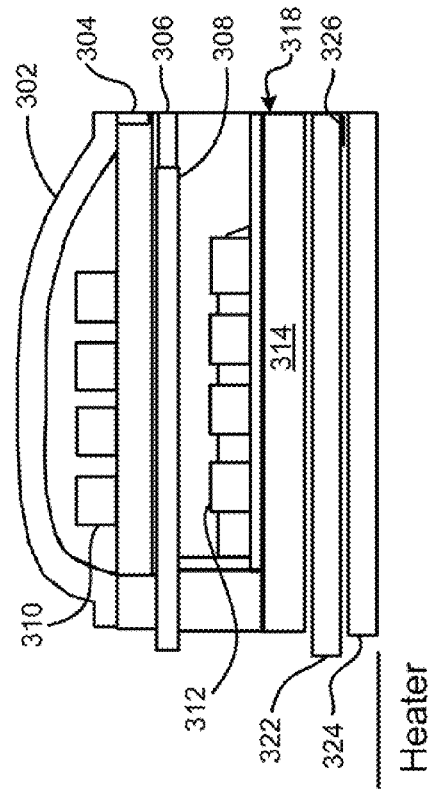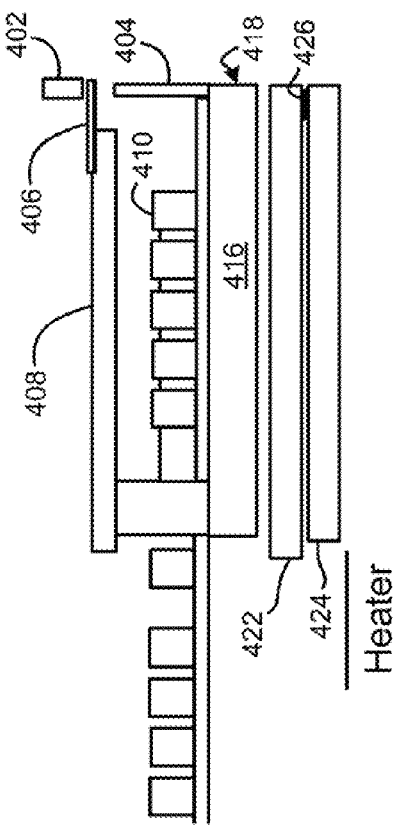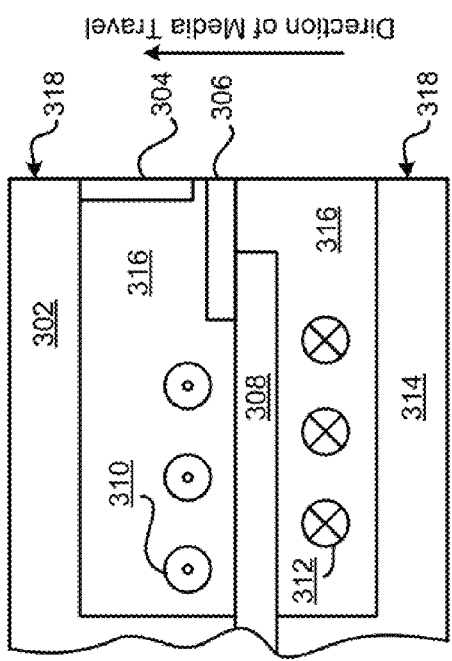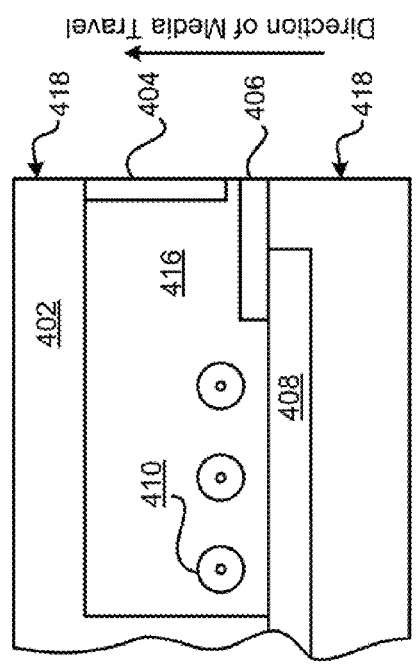

EXTENDED CAVITY VCSEL MOUNTED TO SUBSTRATE WITH ELECTRICAL AND THERMAL CONTACT TO SUBSTRATE AND OPTICAL POWER DIRECTED TOWARD SUBSTRATE

RELATED APPLICATIONS

This application claims priority to U.S. Provisional Patent Application No. 61/363,128, filed on Jul. 9, 2010, and which is herein incorporated by reference.

BACKGROUND

The heart of a computer is a magnetic disk drive which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The ongoing quest for higher storage bit densities in magnetic media used in disk drives have reduced the size (volume) of data cells to the point where the cell dimensions are limited by the grain size of the magnetic material. Although grain size can be reduced further, there is concern that data stored within the cells is no longer thermally stable, as random thermal fluctuations at ambient temperatures are sufficient to erase data. This state is described as the superparamagnetic limit, which determines the maximum theoretical storage density for a given magnetic media. This limit may be raised by increasing the coercivity of the magnetic media or lowering the temperature. Lowering the temperature is not a practical option when designing hard disk drives for commercial and consumer use. Raising the coercivity is a practical solution, but requires write heads employing higher magnetic moment materials, or techniques such as perpendicular recording (or both).

One additional solution has been proposed, which employs heat to lower the effective coercivity of a localized region on the magnetic media surface and writes data within this heated region. The data state becomes "fixed" upon cooling the media to ambient temperatures. This technique is broadly referred to as "thermally assisted (magnetic) recording", TAR or TAMR. It can be applied to both longitudinal or perpendicular recording systems, although the highest density state of the art storage systems are more likely to be perpendicular recording systems. Heating of the media surface has been accomplished by a number of techniques such as focused laser beams or near field optical sources.

U.S. Pat. No. 6,999,384 to Stancil et al., which is herein incorporated by reference, discloses near field heating of a magnetic medium.

Unfortunately, there are several disadvantages to known laser-based systems. For example, as shown in FIG. 21, taken from U.S. Pat. No. 6,778,582 which is herein incorporated by reference for its disclosure of the principles of laser construction and operation, a VCSEL (vertical cavity surface emitting laser), which as shown is a three mirror VCSEL where the third mirror is on the backside of the wafer. This means that the thickness of the semiconductor wafer (such as GaAs based material) forms an external cavity for the VCSEL. The external cavity allows for higher single mode power than can be reached with a typical VCSEL without the external cavity and third mirror. In such prior art designs, the light is emitted from the top, away from the mount. The top mirror is partially reflective and there is an annular contact to the top side. The substrate is doped to allow current to flow from the top contact to the active region. The intermediate mirror, active region, oxide aperture, and highly-reflective bottom mirror are fabricated on the GaAs substrate. The mount provides for the other contact. Because the light is emitted from the top of the laser, device placement is severely limited. Moreover, the opposing position of the contacts makes creating the electrical connections onerous.

An implementation of such a laser is shown in FIG. 22, taken from U.S. Patent Appl. Pub. No. 2008/0002298. As shown in FIG. 22, the VCSEL is mounted to a separate substrate, which is then mounted to bonding pads on the trailing edge of a slider. The heat-sinking and electrical connection of the VCSEL is to the side opposite the light emitting side of the laser, then to the mounting substrate, and then to the bonding pads of the separate substrate. Light from the VCSEL is directed to a split grating coupler fabricated on the slider. The grating couples light into a 2D solid immersion mirror. The polarization of the light leaving the laser is in the cross track direction. Light is delivered by the solid immersion mirror to a lollipop antenna at the air-bearing surface for thermally assisted recording. One disadvantage of this approach is that conventional VCSELs do not have sufficient output power for TAR, thereby apparently rendering the system shown in FIG. 22 inoperable. For example VCSELs typically have a maximum power output of 5 mW. TAR requires output power much higher than 5 mW. 50 mW or higher may be needed for TAR. Another disadvantage is the need for a separate mounting substrate. Finally, the output beam from a conventional VCSEL is very small which makes alignment to the grating more difficult. The spacing between the VCSEL and the grating exacerbates the alignment problem.

What is needed is a way to further improve TAR systems.

SUMMARY

A system according to one embodiment includes a slider adapted for use in a hard disk drive; and a laser coupled to a slider, wherein electrical contacts of the laser are positioned towards or face the slider, wherein light from the laser is emitted towards the slider, wherein the slider acts as a heat sink for the laser.

A system according to another embodiment includes a slider; a magnetic head coupled to the slider; a laser coupled to a slider; a magnetic medium; a thin film waveguide coupled to the slider for directing the light from the laser to an element coupled to the slider, the element being for heating the magnetic medium; a drive mechanism for passing the magnetic medium over the magnetic head; and a controller electrically coupled to the magnetic head for controlling operation of the magnetic head, wherein electrical contacts of the laser are positioned towards or face the slider, wherein light from the laser is emitted towards the slider, wherein the slider acts as a heat sink for the laser.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for recording separately on both sides of the medium.

FIG. 3A is a cross-sectional view of one particular embodiment of a perpendicular magnetic head with helical coils.

FIG. 3B is a cross-sectional view of one particular embodiment of a piggyback magnetic head with helical coils.

FIG. 4A is a cross-sectional view of one particular embodiment of a perpendicular magnetic head with looped coils.

FIG. 4B is a cross-sectional view of one particular embodiment of a piggyback magnetic head with looped coils.

DETAILED DESCRIPTION

Figure 1:
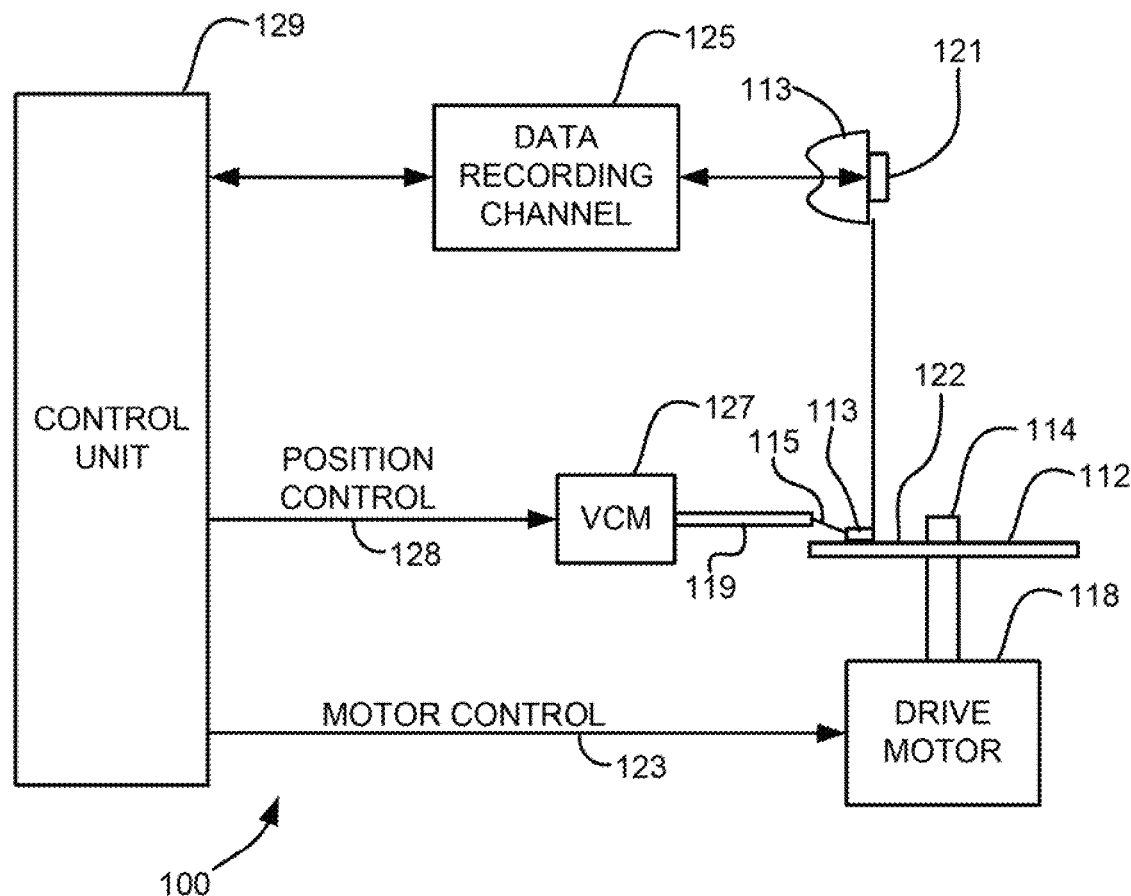
FIG. 1 is a simplified drawing of a magnetic recording disk drive system.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The term "about" is meant to refer to the disclosed value±10% of the value, e.g., "about X" means "X±10% of X."

The following description discloses several preferred embodiments of a laser design, systems incorporating the laser such as magnetic storage systems and other devices, as well as operation and/or component parts thereof.

In one embodiment, a laser such as a monolithic VCSEL or monolithic extended cavity VCSEL (EC-VCSEL, also referred to interchangeably herein as VECSEL) is disclosed which is adapted to mount to a substrate. The laser has both electrical contacts on the same side of the device. Thermal heat-sinking is provided by the substrate. Furthermore, optical power is directed toward the substrate.

In another illustrative embodiment, a laser such as a monolithic VCSEL or monolithic extended cavity VCSEL is mounted directly to the trailing surface of a slider for thermally assisted recording light delivery. The laser is designed so that all electrical contacts are made to mating contacts on the slider deposited end. The contacts provide electrical, mechanical, and thermal connections. The contacts can be made by low temperature solder. The contacts include an n-contact and p-contact. One or more of the contacts may be generally annular in shape (e.g., closed loop such as an O shape, square shape, rectangular shape, oval, etc.; open loop such as a C shape, U shape, etc.) to keep the temperature profile inside the laser axially symmetrical. The contacts may be designed to maximize the thermal heat-sinking to the slider body by using large copper studs with a large surface area and thin gap between the studs and slider ceramic body. The low temperature solder may be reflowed by laser pulse annealing. The contact shape is designed to change with depth to provide for convenient connections to the head suspension electrical contacts.

In yet another embodiment, a laser such as a monolithic VCSEL or monolithic extended cavity VCSEL is mounted directly to the trailing surface of a slider for thermally assisted recording light delivery. The laser is designed so that all electrical contacts may be made to mating contacts on the slider deposited end. The contacts provide electrical, mechanical, and thermal connections. The contacts can be made, e.g., by low temperature solder in some approaches. The contacts include an n-contact and p-contact. In preferred approaches, the contacts are designed to maximize the thermal heat-sinking to the slider body by using large metal studs with a large surface area and a thin gap between the studs and slider body. The low temperature solder may be reflowed by any known method. The contact shape may be designed to change with depth to provide for convenient connections to the head suspension electrical contacts.

A system according to one embodiment includes a slider adapted for use in a hard disk drive; and a laser coupled to a slider, wherein electrical contacts of the laser are positioned towards or face the slider, wherein light from the laser is emitted towards the slider, wherein the slider acts as a heat sink for the laser.

A system according to another embodiment includes a slider; a magnetic head coupled to the slider; a laser coupled to a slider; a magnetic medium; a thin film waveguide coupled to the slider for directing the light from the laser to an element coupled to the slider, the element being for heating the magnetic medium; a drive mechanism for passing the magnetic medium over the magnetic head; and a controller electrically coupled to the magnetic head for controlling operation of the magnetic head, wherein electrical contacts of the laser are positioned towards or face the slider, wherein light from the laser is emitted towards the slider, wherein the slider acts as a heat sink for the laser.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Referring now to FIG. 1, there is shown a disk drive 100 in accordance with one embodiment of the present invention. As shown in FIG. 1, at least one rotatable magnetic disk 112 is supported on a spindle 114 and rotated by a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by control unit 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium may or may not include an under layer 212 of a material having a high magnetic permeability. Regardless, the medium includes an overlying coating 214 of magnetic material preferably having a high coercivity.

Figure 23A:
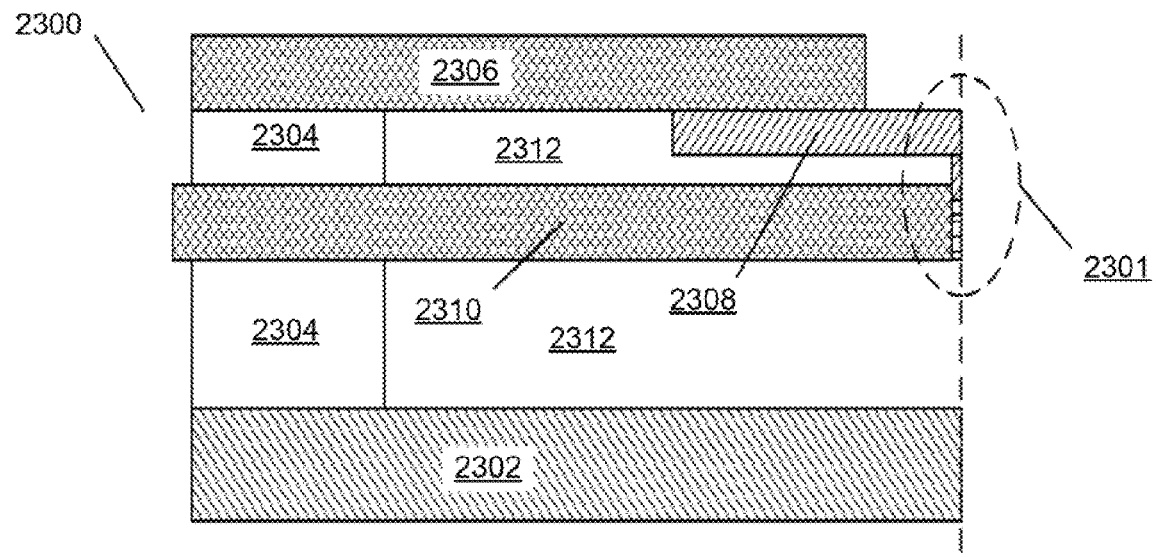
FIGS. 23A and 23B illustrate a head usable for thermally assisted recording, according to one embodiment.
Figure 23B:
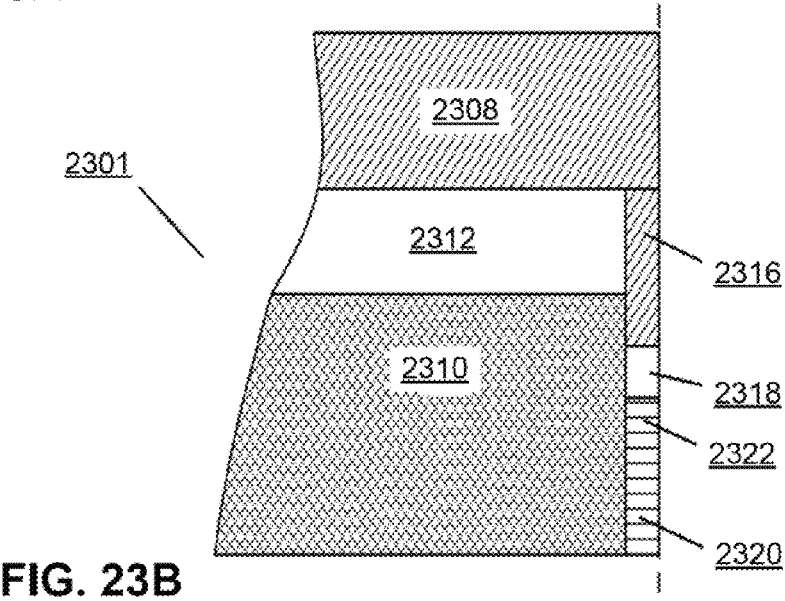

FIGS. 23A and 23B illustrate a head usable for TAR, according to one embodiment. Note that the numbering of FIGS. 23A and 23B correlate only to this paragraph. FIG. 23A is partial, cross section view 2300 of a thin film perpendicular write head design incorporating a ridge (or "C") aperture near field optical source and integrated heatsink, in accordance with an embodiment of the present invention. In order to simplify and clarify the structures presented, spacing layers, insulating layers, and write coil layers have been omitted. The write head comprises lower return pole layer 2302, back-gap layer(s) 2304, upper return pole layer 2306, upper pole tip layer 2308. Lower return pole layer 2302 may also have a lower pole tip (not shown) at the ABS. Layer 2310 is an optical waveguide. Cladding layers, if present, are excluded from the figure for clarity. Layer 2310 extends through at least a portion of back-gap layers 2304. Detail 2301 is shown in an expanded view in FIG. 23B. Coil layers (not shown) and various associated insulating and spacer layers (not shown) may reside within layers 2312, bounded by the ABS, back-gap 2304, lower return pole 2302, and upper bounding layers 2306, and 2308 as would be recognized by those of skill in the art. In some embodiments, the coil wraps around the upper return pole layer 2306. For example, in the cross sectional view of FIG. 23A, the coil would appear in layer 2312 and in a layer overlying the upper return pole 2306. In another embodiment, the coil may wrap around the lower return pole layer 2302. Layers 2302, 2304, 2306, and 2308 are comprised of a suitable magnetic alloy or material, containing Co, Ni, and Fe. Layer 2310 is comprised of a suitable light transmitting material, preferably tantalum pentoxide and/or titanium dioxide. FIG. 23B is a partial cross section expanded view of detail 2301 in FIG. 23A, in accordance with an embodiment of the present invention. Pole lip 2316 is magnetically coupled to upper pole tip layer 2308, and to optional magnetic step layer 2314 (not shown). Optically transparent layer 2318 (contained within the boundaries of the ridge aperture), ridge metal layer 2322, surrounding metal layer 2320, and pole lip 2316 comprise the near field aperture optical source, which is supplied light energy via optical waveguide 2310. Pole lip 2316 and optional magnetic step layer 2314 are comprised of a suitable magnetic alloy, containing Co, Fe, and Ni. Metal layer 2320 and ridge layer 2322 are made of Au or Au alloys. It will be recognized by those skilled in the art however, that other geometries of near field light generating apertures may also be used, such as those having more than one ridge generating both single and/or multiple near field light patterns, such as those described in US Patent Application No. 2008/0149809 by Hamann et al. which is incorporated by reference.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, some TAR media does not have an under layer.

In this structure, the magnetic lines of flux extending between the poles of the perpendicular head 218 loop into and out of the overlying coating 214 of the recording medium of the recording medium causing the lines of flux to pass through the overlying coating 214 in a direction generally perpendicular to the surface of the medium to record information in the overlying coating 214 of magnetic material in the form of magnetic impulses having their axes of magnetization substantially perpendicular to the surface of the medium. The flux is channeled back to the return layer (P1) of the head 218.

FIG. 2E illustrates a similar structure in which the substrate 216 carries the layer(s) 212 (optional) and 214 on each of its two opposed sides, with suitable recording heads 218 positioned adjacent the outer surface of the magnetic coating 214 on each side of the medium, allowing for recording on each side of the medium.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown near the non-ABS side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

Figure 5:
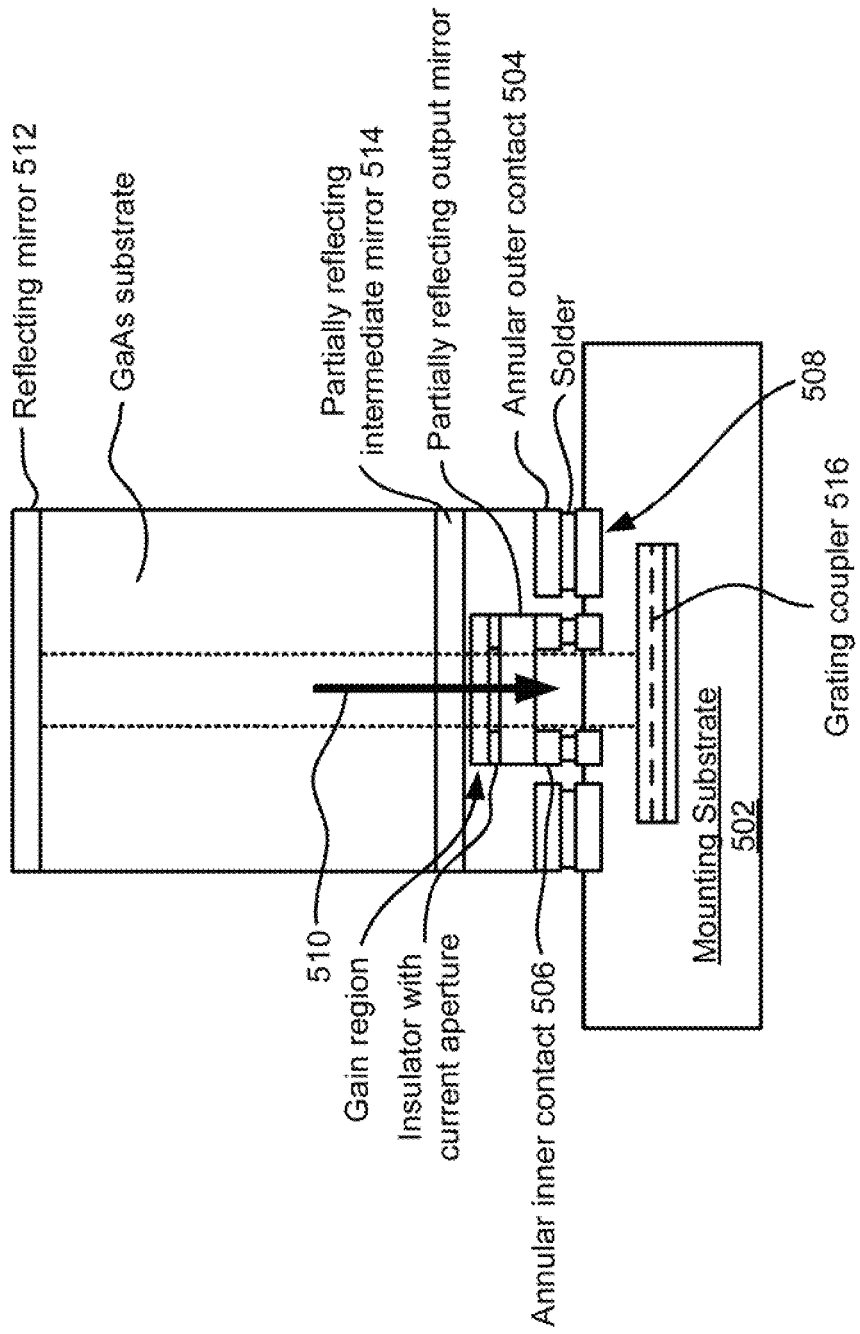
FIG. 5 is a cross sectional view of a monolithic extended cavity VCSEL mounted to a substrate according to one embodiment.

Referring to FIG. 5, there is shown an illustrative system 500 having a laser 501 mounted to a substrate 502. Note that this system is presented by way of example only and should not be deemed limiting in any way.

In various embodiments, the laser may be any suitable type of laser, such as a VCSEL, EC-VCSEL, etc. The substrate may be any type of device, such as an electronic device, wafer, etc.

An EC-VCSEL is particularly preferred for a variety of reasons. For example, the beam waist of an EC-VCSEL is larger than other types of lasers, and therefore allows relaxation of laser alignment tolerances. This is expected to generate a large cost savings. It is also believed that integration of an EC-VCSEL with a slider may be easier than other approaches. Moreover, EC-VCSELS are expected to provide suitable reliability in spite of the demands placed thereon in a HDD environment.

In the illustrative system depicted in FIG. 5, a monolithic extended cavity VCSEL 501 is mounted to a substrate. The EC-VCSEL has both electrical contacts 504, 506 on the same side 508 of the device. Thermal heat-sinking is provided by the substrate. Furthermore, optical power is directed toward the substrate, in the direction indicated by arrow 510.

In the embodiment shown in FIG. 5, the top mirror 512 has a high reflectivity and does not include electrical contacts. This means, in some embodiments, that the substrate (e.g., GaAs or other material known in the art) on which the laser is made does not have to be doped. This can allow for better transparency for the circulating optical power (GaAs is transparent for wavelengths longer than about 920 nm, but doping can reduce this transparency). The bottom mirror 514 is partially reflecting to allow for optical output directed down into the mount. Both n and p contacts are made with the mount which facilitates the routing of the electrical connections within the mount. The e.g., solder contacts provide mechanical, electrical, and thermal connections. The optical integration can be improved by directing the laser output into the mount because the mount may include optical elements for optical routing for a variety of applications. For example, the mount itself can be a slider for a hard disk drive. The mount can include a grating coupler 516 to couple light into a thin film waveguide of a type known in the art, which may be coupled to the slider (including being formed thereon or integrally formed therein). The waveguide may then direct the light to another element coupled to the slider, such as a near field transducer, e.g., a plasmonic antenna used for thermally assisted magnetic recording. Illustrative plasmonic antennas and devices implementing the same are disclosed in U.S. patent application Ser. Nos. 12/347,084, 12/347,134, and 12/347,194, all of which were filed Dec. 31, 2008 and are incorporated herein by reference.

The contacts 504, 506 may be formed of any suitable material known in the art. Illustrative materials include copper, gold, aluminum, etc. When the contacts are oriented on the same side of the laser as the light output, the contacts are preferably oriented to allow the light to be emitted therethrough or therebetween. The contacts may have any desired shape, as discussed in more detail below.

Figure 6A:
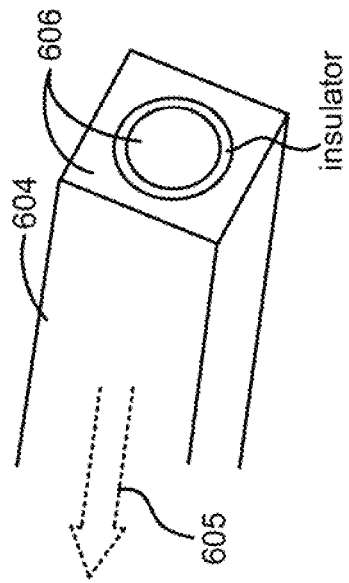
FIG. 6A-6D are depictions of results according to one embodiment and a comparative example.
Figure 6B:
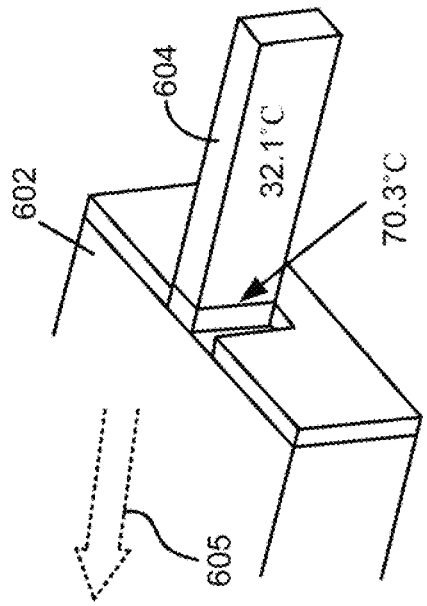
Figure 6C:
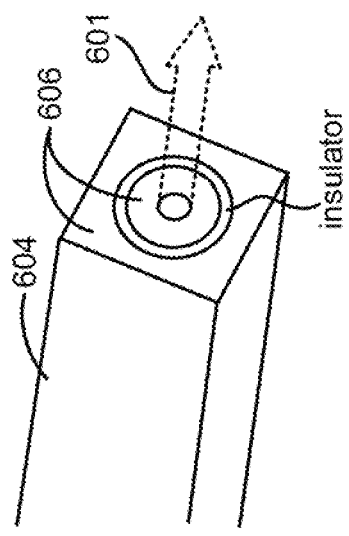
Figure 6D:
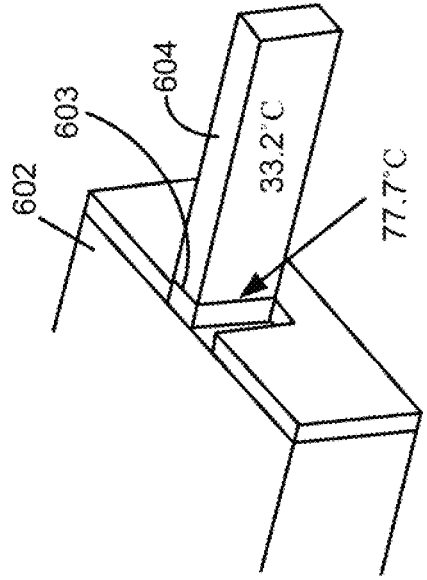

Various embodiments also provide surprising and unexpected results. One expected disadvantage of this geometry was the need for a hole in the bottom contact directly under the active region so that light can be directed through this hole. This hole reduces the heat-sinking of the heat generated by the active region and was expected to result in a higher active region temperature, which in turn was expected to reduce the performance of the laser. However, the inventors have surprisingly and unexpectedly found through thermal modeling that the temperature is only about 10% higher for the case of a hole in the contact compared to the case without a hole. Actual implementations are expected to exhibit a less than about 15% higher, preferably less than about 10% higher, and in some approaches less than about 8% higher average temperature in the active region of the device as compared to a device not having the hole in the bottom. This is a surprising, unexpected, and non-obvious result. Referring to FIGS. 6A-D, the modeling includes a mount 602 that is a slider flying over a disk and assumes 150 mW power dissipation in the active region. As shown in 6A, the laser light 601 is emitted from the same side of the laser 604 as the contacts 606. Referring to FIG. 6B, which shows the modeling of the aforementioned system having the laser of FIG. 6A, the resulting temperature at the interface 603 of the laser and the slider was 77.7° C. above ambient temperature, with the laser itself being 33.2° C. above ambient temperature. These temperatures are only slightly higher than in the corresponding position on the comparative example shown in FIGS. 6C and 6D, where the laser light 605 was, emitted from the end of the laser opposite the contacts. The inventors had expected at least a factor of 2 or more increase in temperature at the laser-slider interface over the comparative example.

Thermal modeling has also shown that the temperature of the transducers (reader and/or writer) is not significantly increased by coupling of the laser to the trailing end of the slider, and thus close to the transducers.

In one particularly preferred embodiment, a monolithic extended cavity VCSEL is mounted directly to the trailing surface of a slider for thermally assisted recording light delivery. The EC-VCSEL is mounted without a sub-mount/carrier/optoelectronic substrate. The EC-VCSEL is made monolithically starting with, e.g., a GaAs wafer. The laser is designed so that all electrical contacts made to mating contacts on the slider deposited end. The contacts provide electrical, mechanical, and thermal connections. The contacts can be made, e.g., by low temperature solder. Other types of lasers known in the art may also be directly mounted to the slider.

Figure 7:
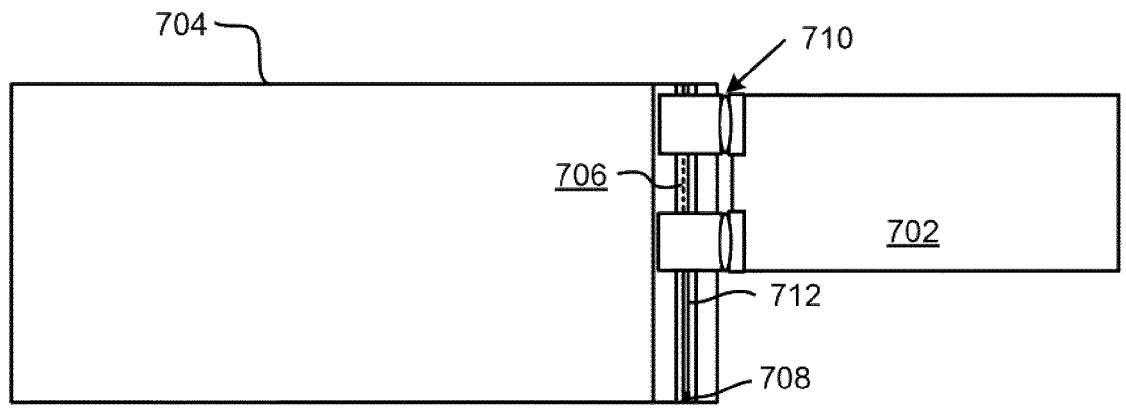
FIG. 7 is a cross sectional view of a monolithic EC-VCSEL mounted to a trailing end of a slider according to one embodiment.

Referring to FIG. 7, a monolithic EC-VCSEL 702 is mounted to the trailing end of a slider 704 for thermally assisted recording light delivery. The trailing end of the slider is typically the end on which the thin films that form the transducers are located. The EC-VCSEL in this embodiment is mounted without a sub-mount/carrier/optoelectronic substrate. This may be a three mirror VCSEL where the third mirror is on the backside of the wafer. This means that the thickness of the semiconductor wafer (such as GaAs based material) forms an external cavity for the VCSEL. The external cavity allows for much higher single mode power than can be reached with a typical VCSEL without the external cavity and third mirror. The EC-VCSEL is made monolithically starting with a GaAs wafer. The laser is designed so that all electrical contacts are made to mating contacts on the slider deposited end. The contacts provide electrical, mechanical, and thermal connections.

In one approach, as exemplified in FIG. 7, the contacts can be made by low temperature solder 710 using, e.g., the flip chip method. Other types of lasers may also be directly mounted to the slider. The dimensions of the laser may be any desired size. The beam waist of the VECSEL is preferably between about 10 microns (μm) and about 50 μm. The wavelength may be any suitable wavelength. The output power may be between about 10 milliwatt (mW) and about 100 mW. Of course, as in any embodiment presented herein, the dimensions and ranges are illustrative only, and various implementations may use higher and/or lower values than those presented herein.

The light is coupled into a grating coupler 706 of a type known in the art, such as that described in reference G. Roelkens, D. Vermeulen, D. Van Thourhout, R. Baets, S. Brision, P. Lyan, P. Gautier, and J. M. F' ed' eli, "High efficiency diffractive grating couplers for interfacing a single mode optical fiber with a nanophotonic silicon-on insulator waveguide circuit," Appl. Phys. Lett. 92, 131101 (2008). The grating coupler may be straight or curved and may be designed for high efficiency and is preferably matched to the beam size from the EC-VCSEL. The size of the grating and beam may allow for easy alignment—for example about a 5 μm alignment tolerance is possible in some embodiments. The size of the grating and beam size may also be designed for sufficient bandwidth to accommodate the laser wavelength variation over the operating temperature range inside an HDD environment. In general, the larger the grating used, the narrower the bandwidth of the laser that should be used. Conversely, the smaller the grating, the higher the bandwidth of the laser should be used. Thus, by tuning the grating and/or the laser cavity length, the optimum result can be obtained. The polarization of the light from the laser is preferably perpendicular to the disk. The grating coupler delivers light via a thin film waveguide 712 to a near field transducer 708 such as an E-antenna at the air bearing surface.

Figure 8:
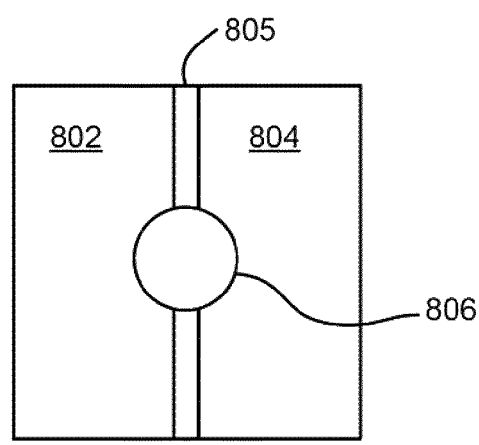
FIG. 8 is a side view of a laser according to one embodiment.

The contacts for the laser may have any desired shape. In one approach, the contacts may be nested, and potentially concentric. See, e.g., FIG. 6A. FIG. 8 illustrates one design for the laser contacts 802, 804 separated by an insulator 805, and an aperture 806 through which the laser light is emitted. In other approaches, the contacts may have annular and/or arcuate sections, may be interleaved about the aperture, etc. One or more generally annular contacts are preferred, and are believed to keep the temperature profile inside the laser axially symmetrical.

Figure 9:
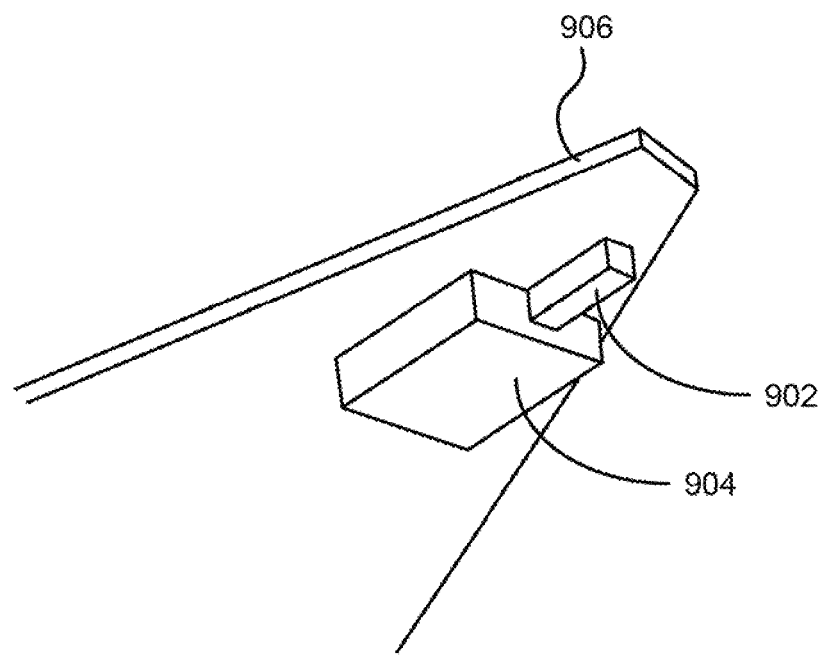
FIG. 9 is a perspective view of a laser mounted to the trailing end of a slider.

FIG. 9 illustrates an embodiment in which a laser 902 is mounted to the trailing end of a slider 904. The slider is coupled to an arm or gimbal 906 of a type known in the art. Electrical routing may be integrated in the laser.

Figure 10:
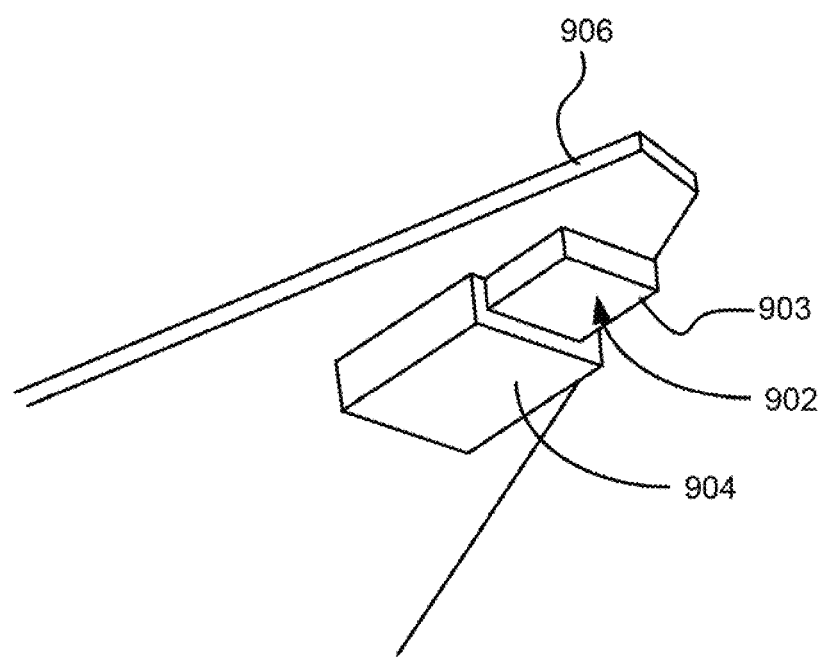
FIG. 10 is a perspective view of a laser mounted to a submount that is mounted to the trailing end of a slider.

FIG. 10 illustrates an embodiment in which the laser 902 is mounted to a submount 903 (e.g., interposer) on the slider 904. The slider is coupled to an arm or gimbal 906 of a type known in the art. The submount may include electrical routing, e.g., leads and pads of known construction, to effectively extend the laser-related pads of the slider out to a surface of the submount adjacent the contacts of the laser, thereby coupling the pads of the slider to the contacts of the laser. In an alternate embodiment, the laser may be encapsulated on at least one side thereof in an encapsulant known in the art, such as alumina, a polymer, etc. A mounted or encapsulated VCSEL is referred to herein as an integrated VCSEL.

Other mounting approaches contemplated, and usable in various embodiments, include side mounting, where the laser is mounted to one side or the other of the slider; top mounting; front mounting. However, each of these approaches presented complications that made such mounting undesirable or impossible, though not foreclosed. Top mounting, while still a candidate for implementation, would have interfered with coupling of the head to the gimbal. Side mounting was found to cause adverse head behavior upon occurrence of an op-shock event, which is a shock event that occurs during HDD operation, as discussed in more detail below.

Figure 11:
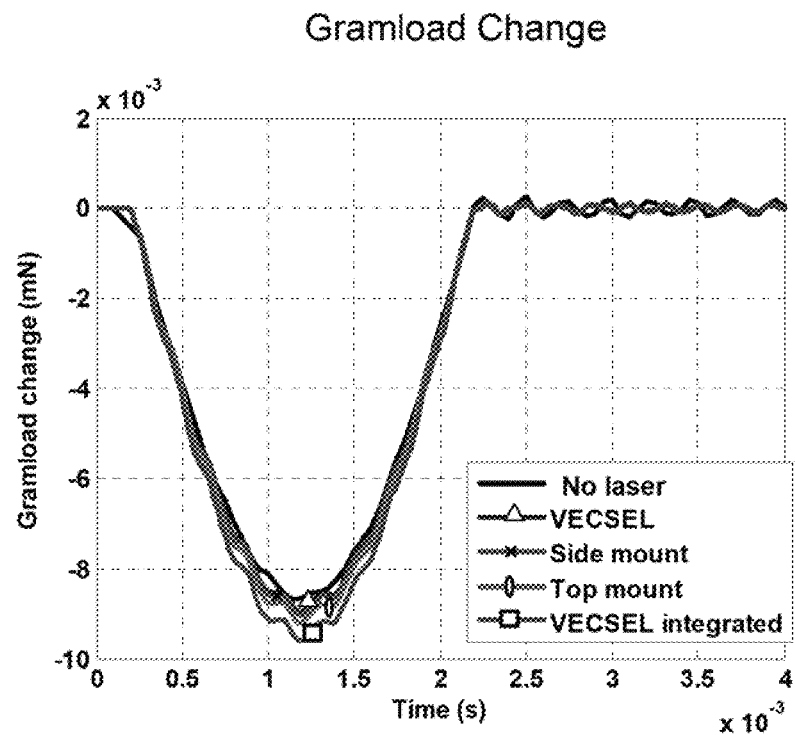
FIG. 11 is a chart depicting results of modeling according to various embodiments.
Figure 12:
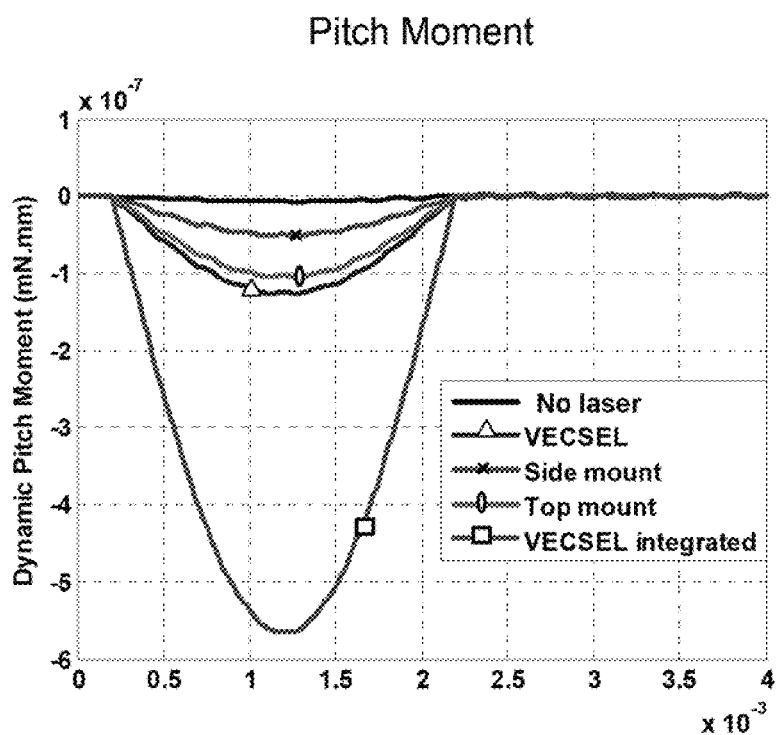
FIG. 12 is a chart depicting results of modeling according to various embodiments.
Figure 13:
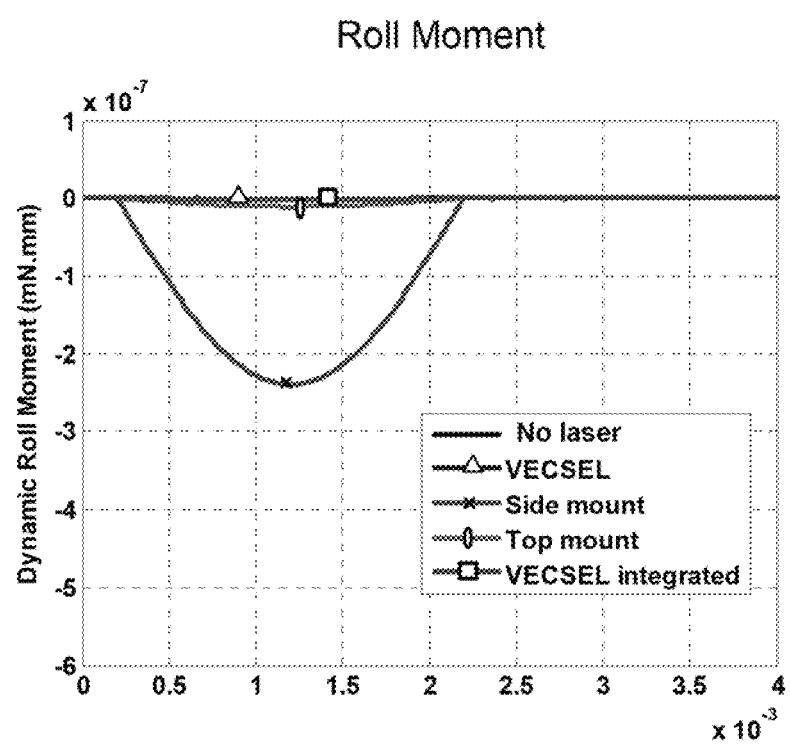
FIG. 13 is a chart depicting results of modeling according to various embodiments.

Mounting to the trailing edge was initially expected to cause problems during op-shock events, especially because of the added weight at the trailing end of the slider. However, the inventors surprisingly and unexpectedly found that op-shock performance is actually improved relative to the conventional slider configuration without the laser and also relative to a top mounted slider. Without wishing to be bound by any theory, it is believed that the laser mass reduces the fly-height excursion and pitch change during the op-shock event. To demonstrate the unpredictably beneficial effect of the new mass distribution of the combined slider-laser unit, simulations of the mechanics of the trailing-side mounted EC-VCSEL during an op-shock event during HDD operation were generated. The results are found in FIGS. 11-13. The VECSEL and integrated VECSEL were simulated as being mounted to the trailing edge of the slider, e.g., as in FIGS. 9 and 10. Referring to FIG. 11, the gramload change was about the same for all laser positions, with the exception of the VCSEL integrated, which has a larger mass due to the encapsulant. Referring to FIG. 12, the pitch moment is surprisingly and dramatically improved in the case of a VCSEL or integrated VCSEL. The pitch moment offsets the effect of the op-shock event. Moreover, addition of the laser surprisingly and unpredictably allowed the system to handle an op-shock better than the slider without the laser. Referring to FIG. 13, it is seen that the side mounted laser creates a large roll moment, which results in an undesirable "roll" torque on the head.

Figure 14A:
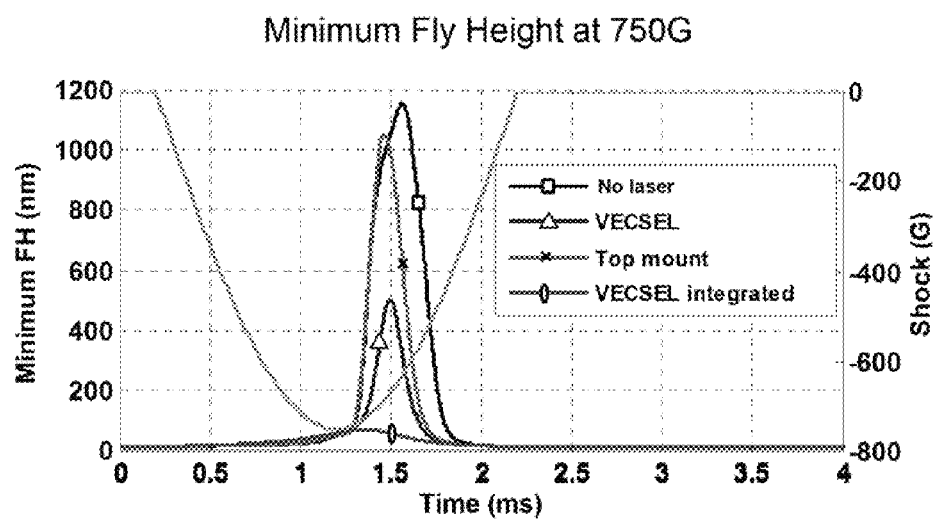
FIGS. 14A and 14B are charts depicting results of modeling according to various embodiments.
Figure 14B:
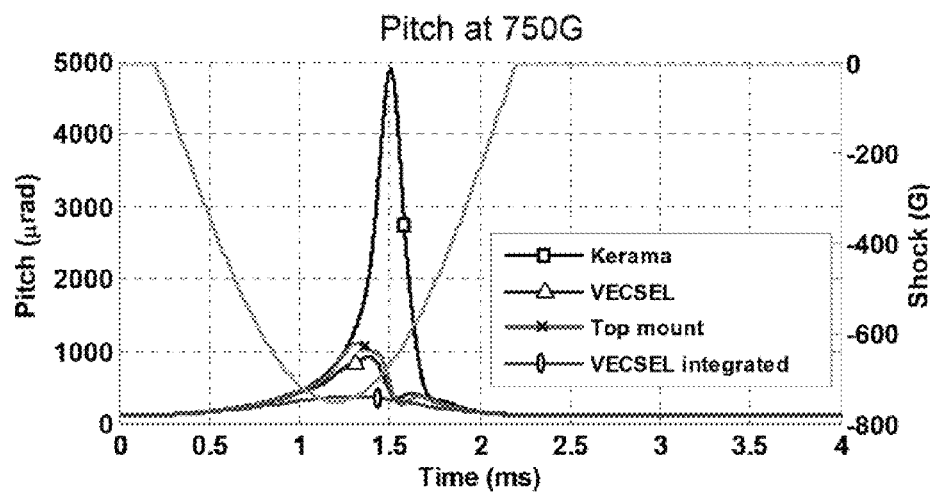
Figure 15A:
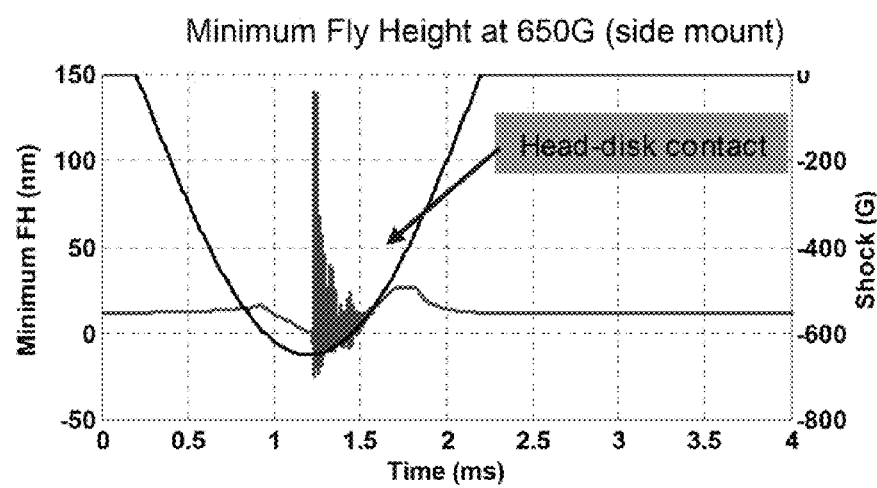
FIGS. 15A and 15B are charts depicting results of modeling according to one embodiment.
Figure 15B:
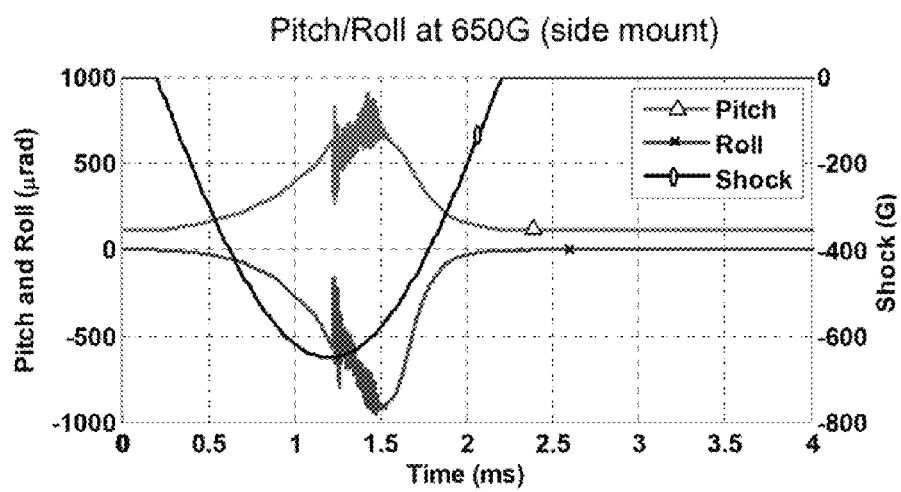

FIGS. 14A-15B depicts what happens to the fly height of a bare slider and sliders with lasers attached as noted in each FIG. The line opening upward in each graph illustrates the 2 ms G force applied in the modeling used to generate the charts. As shown in FIGS. 14A and 14B, the VECSEL (EC-VCSEL) and integrated VECSEL (EC-VCSEL) have significantly reduced motion in height and pitch during the shock than the case without laser. The models with the laser mounted to a side of the slider (side mount) (FIGS. 15A and 15B) has head-disk contact at 650 G due to large pitch/roll angles during the shock, which may be a concern.

Another anticipated concern with embodiments in which the laser is coupled to the trailing end of the slider was that it was expected that the laser could become delaminated during an op-shock event due to its position and length. However, the inventors surprisingly found through modeling that the joint stress at the laser-slider interface during a shock event is far below the breakage limit of a typical solder, e.g., >25-50 MPa, so de-lamination is now not expected to occur. Modeling results of the stresses encountered by the system upon application of a 1000 G shock revealed that the maximum stress was only about 0.7 MPa.

Figure 17:
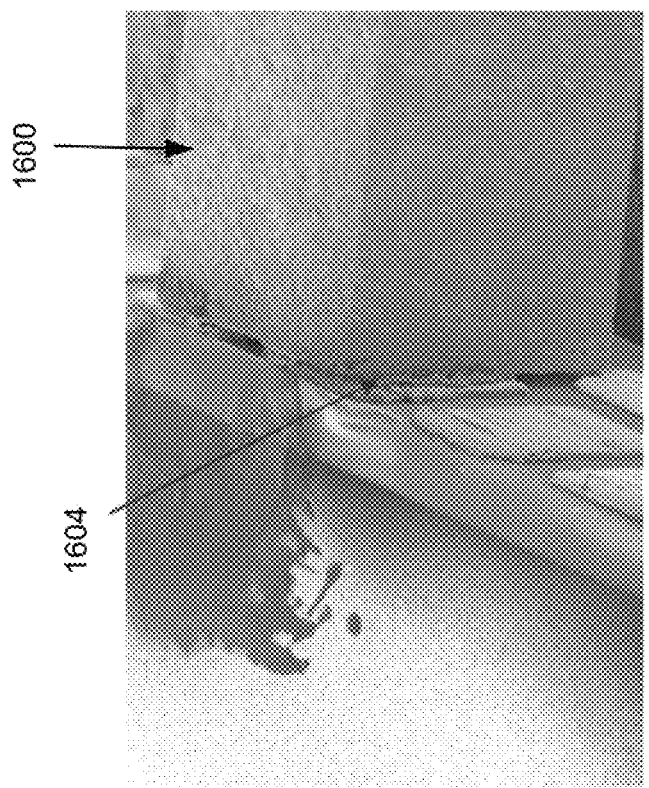
FIG. 17 is a detail of the structure shown in FIG. 16.
Figure 16:
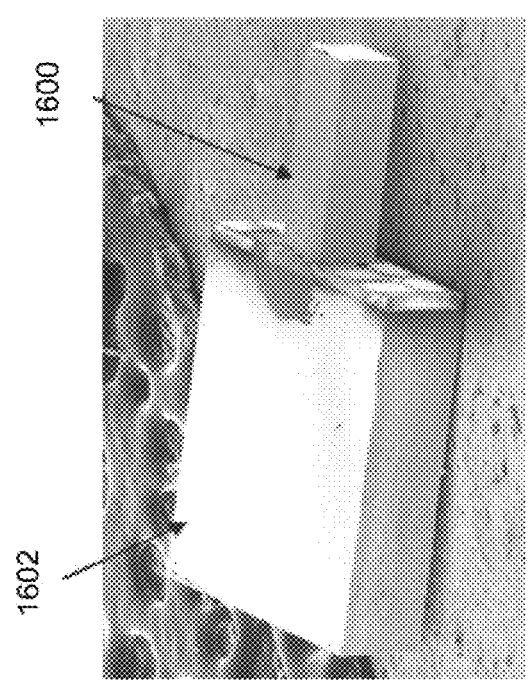
FIG. 16 is a depiction of a GaAs piece coupled to a slider.

An example of a GaAs piece 1600 with specified dimensions of an EC-VCSEL coupled to a slider 1602 is shown in FIG. 16. FIG. 17 is a detailed view of the connection joint 1604, where the piece 1600 was attached to a slider using solder paste. For mass production it may be desirable to use solder reflow by general heating.

Figure 18:
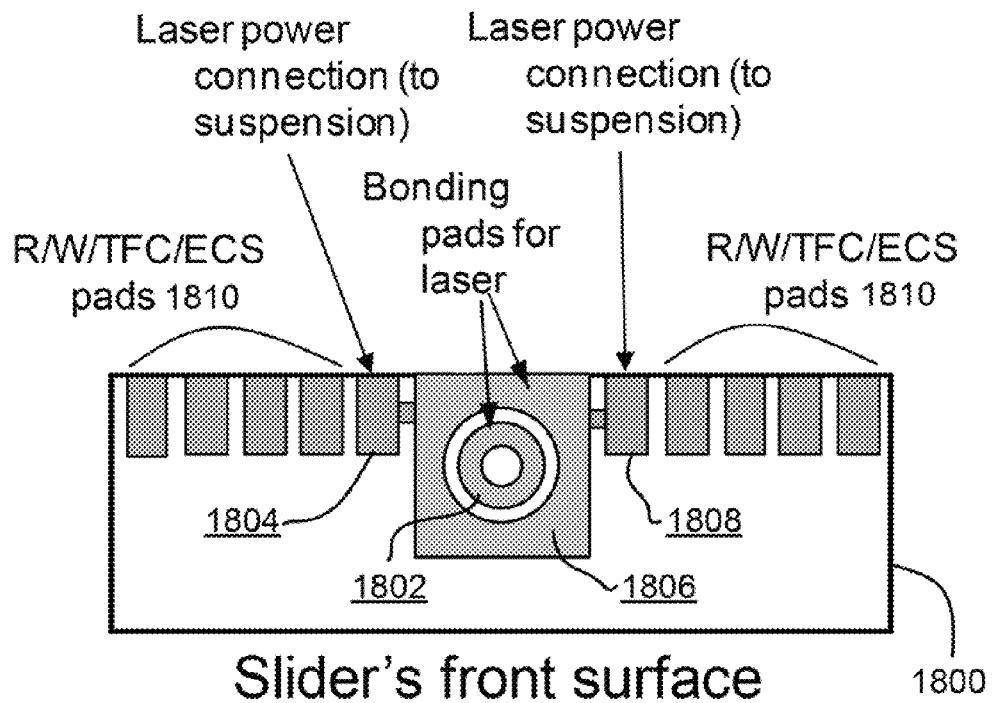
FIG. 18 is a side view of a slider according to one embodiment.
Figure 19:
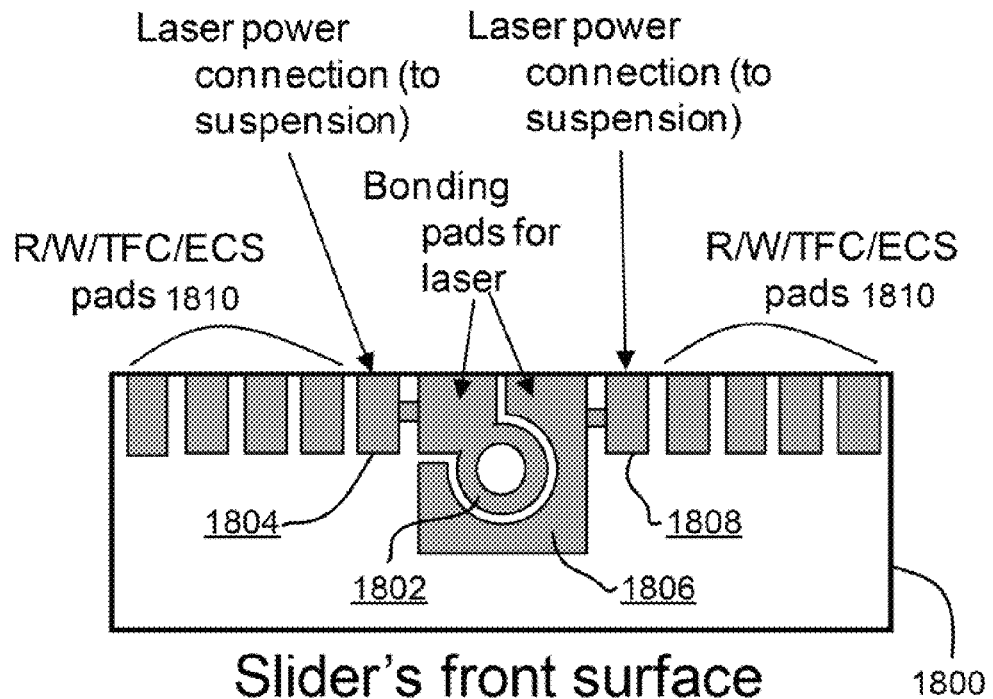
FIG. 19 is a side view of a slider according to one embodiment.

The boding pad geometries at the surface of the slider 1800 and below the surface of the slider are shown in FIGS. 18 and 19, respectively. The surface geometry is generally annular to mate with the preferably annular contacts on the EC-VCSEL. However, as shown, the inner conductor 1802 is routed below the slider surface to a pad 1804 which can be accessed by the suspension (or other) traces for conventional coupling, e.g., using solder techniques known in the art. The outer conductor 1806 may also be routed to an accessible pad 1808. The surface area of the pads may be increased by extending them outward near or in the slider, even extending them under the other pads on the trailing edge. This has the effect of maximizing thermal conduction from the laser to the slider. For example, if the dimensions of the conductors 1802, 1806 are increased by 2× relative to the exposed end, the cross-sectional surface area is increased by 4×, resulting in greatly improved thermal conduction.

Also shown in FIGS. 18 and 19 are pads 1810 for other devices in the slider, such as readers (R), writers (W), thermal fly height control (TFC), electrical contact sensor (ECS), etc.

Preferably, any intervening layer between the conductors 1802, 1806 and the slider body is very thin to promote heat transfer. For example, if alumina is used to separate copper conductors from an AlTiC substrate, the alumina is preferably less than about 1 micron thick. Ideally, about the thinnest underlayer that still provides any desired electrical isolation is used.

Figure 20:
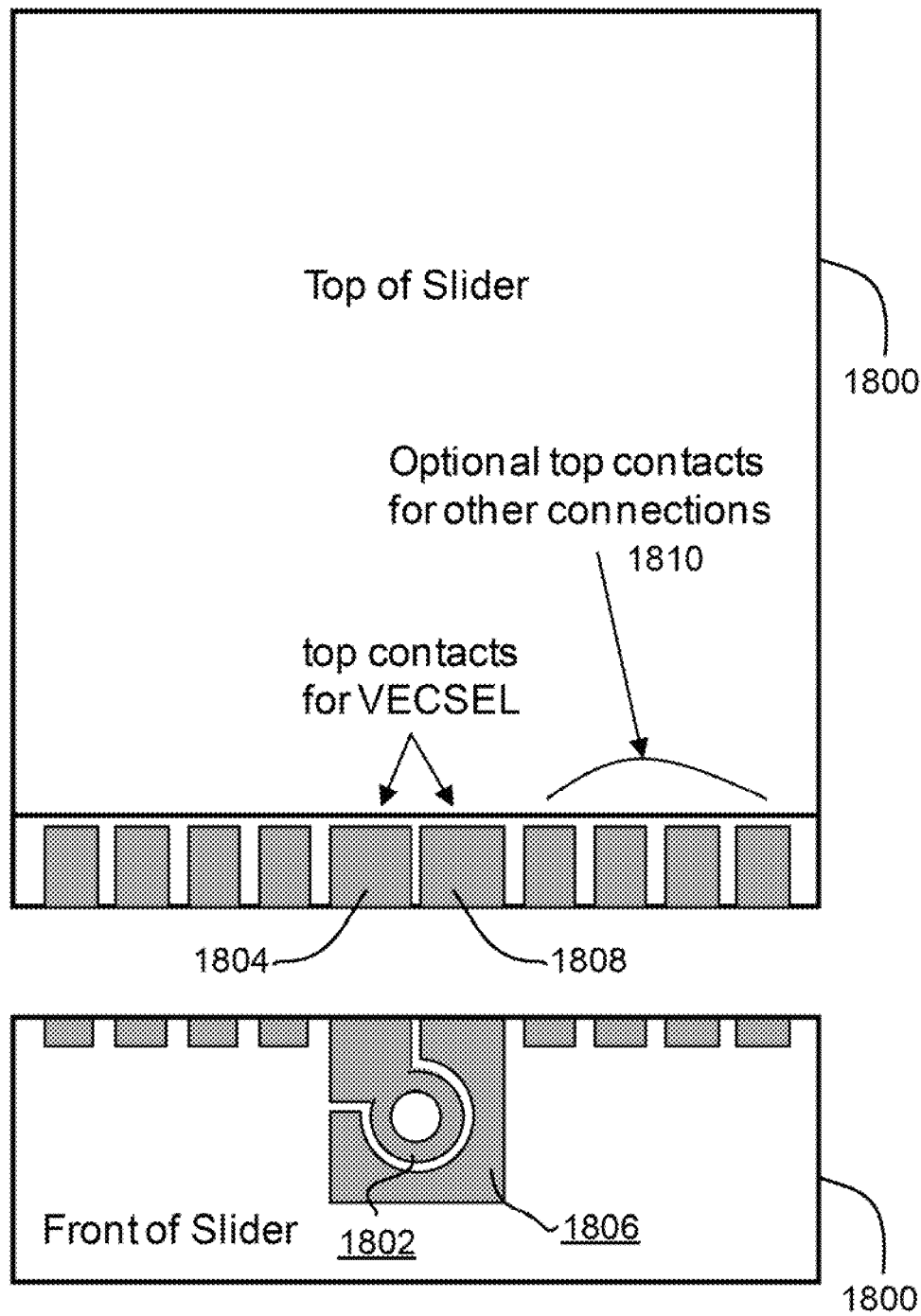
FIG. 20 is a side view of a slider according to one embodiment.
Figure 21:
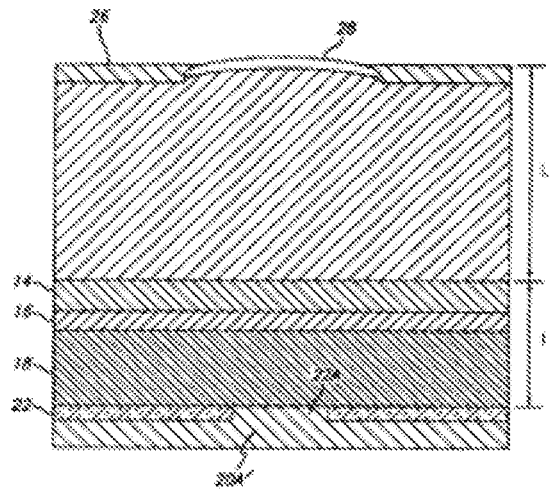
FIG. 21 is a cross sectional view of a prior art system.
Figure 22:
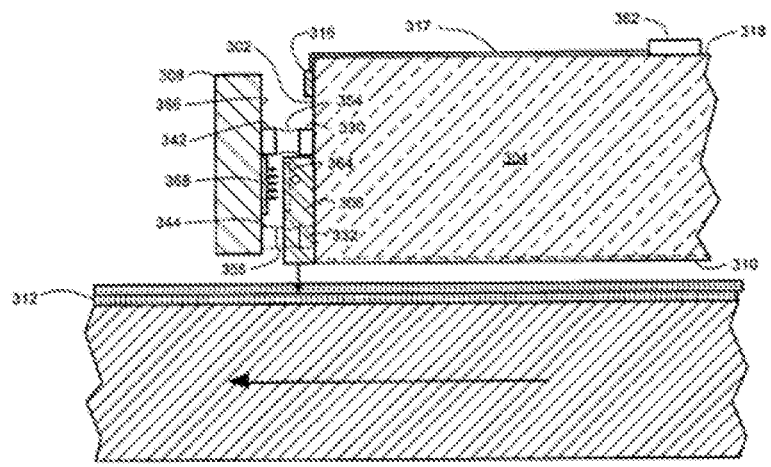
FIG. 22 is a cross sectional view of a prior art system.

In embodiments needing a very small pad pitch for connection to the suspension leads, the contact pads may be routed to the top of the slider, e.g., by exposing them by wafer dicing process followed by lapping process, which are standard slider fabrication steps, or by performing additional bonding pad patterning process on the slider top surface, etc. The suspension traces may then be contacted to the top of the slider where more area is available for the contacts. This concept is shown in FIG. 20, which shows a top view of the slider and trailing side cross sectional view of the slider. The elements are numbered as in FIG. 18.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
a slider configured for use in a hard disk drive, the slider having electrical contacts on a trailing surface thereof; and
a laser having a slider-facing surface that includes electrical contacts, the electrical contacts of the laser mating with the electrical contacts on the trailing surface of the slider,
wherein the electrical contacts of the laser include a first electrical contact and a second electrical contact,
wherein light from the laser is emitted towards the slider through an aperture of the laser that is at least partially encircled by at least one of the first electrical contact and the second electrical contact on the slider-facing surface of the laser,
wherein the slider acts as a heat sink for the laser.

2. The system as recited in claim 1, wherein the laser is a vertical cavity surface emitting laser (VCSEL), and wherein the laser is positioned entirely externally to the slider.

3. The system as recited in claim 1, wherein the laser has a reflecting mirror positioned away from the slider and a partially reflecting output mirror positioned towards the slider.

4. The system as recited in claim 1, further comprising a thin film waveguide coupled to the slider for directing the light from the laser to an element coupled to the slider.

5. The system as recited in claim 4, wherein the element is a plasmonic antenna, wherein at least some contact pads on the slider extend at least partially along the trailing surface thereof and a top thereof, wherein the at least some of the contact pads are coupled to conductors extending along a suspension.

6. The system as recited in claim 1, wherein the laser is coupled to the trailing surface of the slider, and the aperture of the laser is completely encircled by the at least one of the first electrical contact and the second electrical contact on the slider-facing surface of the laser.

7. The system as recited in claim 1, wherein the laser is coupled to the trailing surface of the slider, the laser being mounted to a submount coupled to the trailing surface of the slider, wherein the submount includes electrical routing to couple laser-related pads of the slider to the electrical contacts of the laser.

8. The system as recited in claim 1, wherein at least some contact pads on the slider extend at least partially along the trailing surface thereof and a top thereof, wherein the at least some of the contact pads are coupled to conductors extending along a suspension.

9. The system as recited in claim 1, further comprising
a magnetic head coupled to the slider;
a magnetic medium;
a drive mechanism for passing the magnetic medium over the magnetic head; and
a controller electrically coupled to the magnetic head for controlling operation of the magnetic head.

10. The system as recited in claim 9, wherein a polarization of the light from the laser is perpendicular to the magnetic medium.

11. The system as recited in claim 1, wherein the laser is one of a vertical cavity surface emitting laser (VCSEL) or an extended cavity VCSEL (EC-VCSEL).

12. The system as recited in claim 1, wherein a substrate of the laser is not doped.

13. The system as recited in claim 1, further comprising a plasmonic antenna for heating a magnetic medium.

14. The system as recited in claim 1, wherein at least one of the first electrical contact and the second electrical contact on the slider-facing surface of the laser is generally annular.

15. The system as recited in claim 14, wherein the first electrical contact and the second electrical contact on the slider-facing surface of the laser are nested such that the first electrical contact is generally concentric around the aperture of the laser, and the second electrical contact is generally concentric around the first electrical contact.

16. The system as recited in claim 1, wherein the laser is coupled to the trailing surface of the slider, the laser being encapsulated.

17. The system as recited in claim 15, wherein the aperture of the laser is a hole in the first contact of the laser.

18. The system as recited in claim 15, wherein the electrical contacts on the trailing surface of the slider include a third electrical contact and a fourth electrical contact, wherein the third electrical contact and the fourth electrical contact on the trailing surface of the slider are nested such that the fourth electrical contact is generally concentric around the third electrical contact, wherein the first electrical contact of the laser mates with the third electrical contact on the trailing surface of the slider, and the second electrical contact of the laser mates with the fourth electrical contact on the trailing surface of the slider.

19. The system as recited in claim 4, wherein the element includes a near field aperture optical source, and the thin film waveguide interfaces with the near field aperture optical source such that the thin film waveguide provides light energy to the near field aperture optical source, wherein the near field aperture optical source is defined by, at least in part, a ridge metal layer and a pole lip, and wherein the thin film waveguide is located between a lower return pole layer and an upper return pole layer of a write head.

20. The system as recited in claim 19, wherein a first portion of the thin film waveguide is proximal to the interface with the near field aperture optical source, and a second portion of the thin film waveguide is distal from the interface with the near field aperture optical source, wherein the second portion of the thin film waveguide is located within back-gap layers.

21. The system as recited in claim 20, wherein the pole lip is magnetically coupled to an upper pole tip layer that is coupled to the upper return pole layer, and comprising a coil that wraps around the upper return pole layer.

* * * * *